H. A. CROSSLEY.
BELTING.
No. 194,993. Patented Sept. 11, 1877.
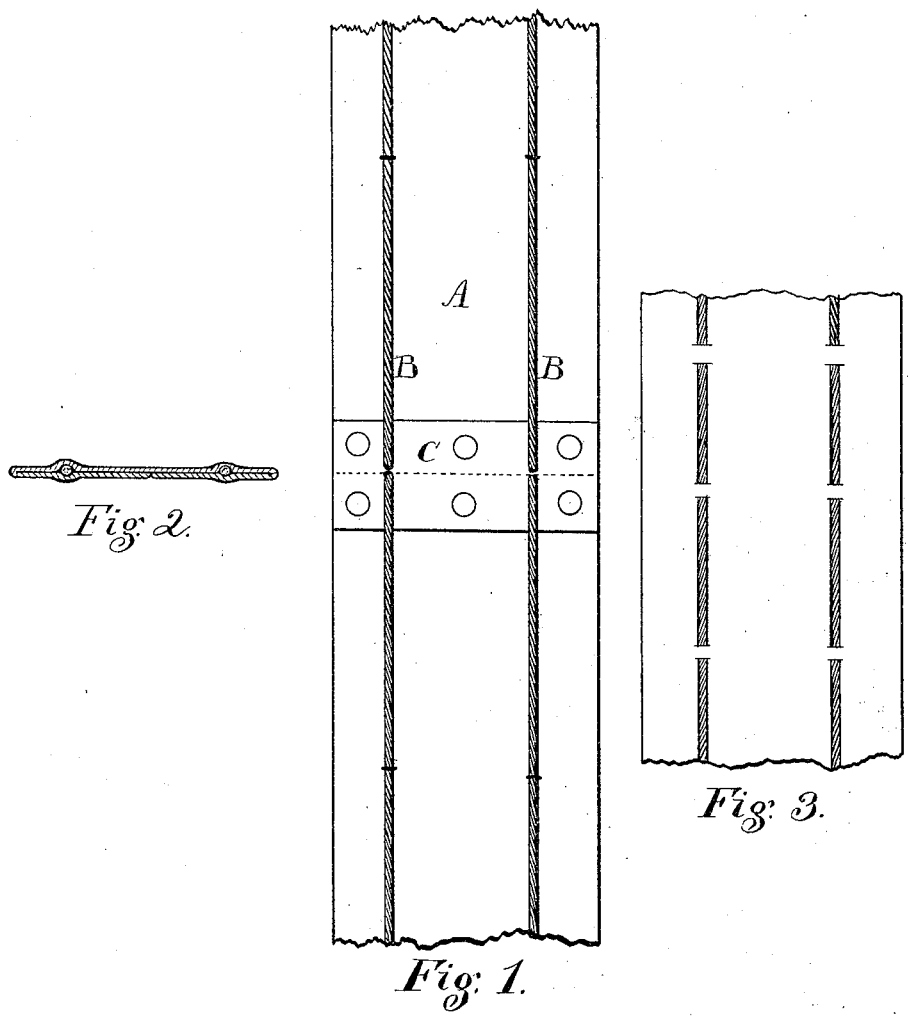
Witnesses
S. M. York.
Jos. Mehan.
H. A. Crossley Inventor
By Geo. W. Tibbitts Attorney

UNITED STATES PATENT OFFICE.

HARRY A. CROSSLEY, OF CLEVELAND, OHIO.

IMPROVEMENT IN BELTING.

Specification forming part of Letters Patent No. 194,993, dated September 11, 1877; application filed December 9, 1876.

*To all whom it may concern:*

Be it known that I, HARRY A. CROSSLEY, of Cleveland, in the county of Cuyahoga, in the State of Ohio, have invented a new and useful Improvement in Belting for use in driving machinery, of which the following is a full, clear, and exact description.

Belting has heretofore been made by interposing between two pieces of material—as leather—one or more strands of wire or strips of steel, and sewing or otherwise uniting these pieces about the said wires or strips, so as to intimately connect the metal and leather; the object to be attained by this construction being increased strength, and the prevention or taking up of stretch in the leather.

Belts or straps have also been made of wedge-shaped pieces of gutta-percha, united together, and provided with a chain or wire rope on their backs to prevent stretching.

My improvement consists in attaching to the outer surface of old or new ordinary leather, rubber, or other flat belting, two or more wire cables, having their ends secured in any suitable manner.

In the drawings hereunto annexed, Figure 1 illustrates my improvement. Fig. 2 is a cross-section of a woven belt with cables therein. Fig. 3 is a plan view, illustrating one mode of fastening the cables to the belt.

A represents a flat belt, of leather, rubber, or other material, the ends of which may be joined or spliced in any suitable manner—as, for illustration, by a metal plate, C, and rivets. B B are two strands of wire cable, placed on the exterior surface of the belt, near its edges, and secured at intervals thereupon by wire staples, or equivalent fastenings or modes of fastening. The ends of the strands of cable may be fastened or secured by passing them through the plate C, and soldering them thereto on the under side.

Belting having wire cable thus combined with it is greatly re-enforced in strength, its durability correspondingly increased, and nearly or quite all stretching of the belting prevented, as the cable takes up the bulk of the strain upon the belt.

Old belting may be re-enforced to great advantage with wire cable in the manner above described.

By the use of wire cable the weight and cost of belting material are greatly reduced.

What I claim is—

As an improved article of manufacture, flat belting having longitudinal strands of wire cable attached to its exterior surface by wire staples or other suitable fastenings, substantially as described.

H. A. CROSSLEY.

Witnesses:
    GEO. W. TIBBITTS,
    B. S. DE FOREST.